United States Patent
De La Roij

(10) Patent No.: US 7,316,744 B2
(45) Date of Patent: Jan. 8, 2008

(54) COMPOSITION WHICH IS INTENDED FOR USE AS AN ADDITIVE FOR CEMENT

(75) Inventor: Robin De La Roij, Dordrecht (NL)

(73) Assignee: Megatech Holding B.V., Dordrechr (NL)

(*) Notice: Subject to any disclaimer, the term of this patent is extended or adjusted under 35 U.S.C. 154(b) by 544 days.

(21) Appl. No.: 10/450,495

(22) PCT Filed: Dec. 14, 2001

(86) PCT No.: PCT/NL01/00913

§ 371 (c)(1),
(2), (4) Date: Jun. 16, 2003

(87) PCT Pub. No.: WO02/48067

PCT Pub. Date: Jun. 20, 2002

(65) Prior Publication Data

US 2004/0040475 A1   Mar. 4, 2004

(30) Foreign Application Priority Data

Dec. 15, 2000   (NL) .................................. 1016892

(51) Int. Cl.
  *C04B 40/00*  (2006.01)
  *C04B 14/00*  (2006.01)
  *C04B 7/00*  (2006.01)

(52) U.S. Cl. .................. 106/819; 106/734; 106/737; 106/811; 106/812; 106/813; 106/815

(58) Field of Classification Search ................ 106/734, 106/737, 811, 812, 813, 815, 819
See application file for complete search history.

(56) References Cited

U.S. PATENT DOCUMENTS 2,929,729 A    3/1960  Waggoner
4,662,943 A *  5/1987  Baker et al. ................ 106/720
5,488,991 A *  2/1996  Cowan et al. .............. 166/293

OTHER PUBLICATIONS

St. John et al., "Concrete Petrography", A handbook of investigative techniques, p. 165-185, 1998.*
Chigira et al., Weathering mechnisms and their effects on the landsliding of ignimbrite subject to vapor-phase crystallization in the Shirakawa pyroclastic flow, northern Japan, Engineering Geology 66, pp. 111-125, 2002.*
Derwent Publications Ltd., 86-059199 JP 61011117 (abstract), Jan. 1986.
Derwent Publications Ltd., 1991-316123 SU 1627715 (abstract), Feb. 1997.
Derwent Publications, Ltd., 1981-84535D JP 56126283 (abstract), Oct. 1981.
Derwent Publications, Ltd. 1972-67718T JP 72040608 B (abstract), 1972 no month.

* cited by examiner

*Primary Examiner*—Elizabeth D. Wood
(74) *Attorney, Agent, or Firm*—Young & Thompson

(57) ABSTRACT

The present invention relates to an additive which is added in order to reinforce cement. The additive comprises chlorides of alkali metals, alkaline earth metals and/or transition metals and oxides selected from the group consisting of alkali metal and alkaline earth metal oxides, aluminum oxide, silica, apatite and/or zeolites and comprises, in particular, a combination of sodium chloride, ammonium chloride, aluminum chloride, potassium chloride, calcium chloride, magnesium chloride, magnesium oxide, magnesium sulfate, sodium carbonate, silica, apatite and/or zeolites. Additives of this type can be used, inter alia, to stabilize/modify cement; consolidate sand and/or soil, such as when building roads, dykes, tunnels, foundations and the like, immobilize pollutants, during the injection of cement compositions, such as grouting, and for the production of concrete.

13 Claims, No Drawings

COMPOSITION WHICH IS INTENDED FOR USE AS AN ADDITIVE FOR CEMENT

BACKGROUND OF THE INVENTION

The present invention relates to a composition which is intended for use as an additive for cement and to applications for compositions of this type.

DESCRIPTION OF THE RELATED ART

In various sectors, cement is used as a binder. Possible applications of cement include the stabilization of soil, when building bored wells, houses, roads and tunnels, the immobilization of pollutants or sludge, the production of concrete, etc. In these applications, additives which increase the binding force of cement are generally added to the cement.

Alkali metal and alkaline earth metal chlorides are generally used as the basis for cement additives of this type. For example, WO 99/37594 describes an additive based on alkali metal and alkaline earth metal halides, iron chloride, au organic acid and a hydratable polymer for reinforcing boreholes. WO 00/76936 refers to an additive for reinforcing cement which, in addition to alkali metal and alkaline earth metal chlorides, also contains polyoxyalkylene polymers and sugars.

JP61011117A describes an ion exchange filter based on a water-permeable mineral, cement and a hardening agent for cement. The hardening agent contains a number of alkali metal and alkaline earth metal chlorides, and also sodium sulphate, aluminium chloride, citric acid and cobalt chloride, CN1121494A proposes a number of chlorides as ingredients for a hardening agent, in addition to sodium carbonate, sodium silicate, magnesium carbonate, calcium hydroxide and calcium sulphate.

It has been found that current additives for cement do not produce sufficient mechanical strength in various applications, or that the strength achieved deteriorates over the course of time. The thermal load, for example in tunnels and buildings, is also a worry. Furthermore, it has been found that the hardening of cement mix is greatly affected by the weather conditions, especially when it is raining. This can limit the progress of construction projects. Other problems may arise as a result of the use of soil or water which is contaminated with organic compounds for the preparation of cement for immobilization or for (road)building. In such cases, hardening also becomes more difficult.

DESCRIPTION OF THE PREFERRED EMBODIMENTS

It is an object of the present invention to overcome the above problems. To this end, the invention provides a composition for reinforcing cement, which contains:

a. sodium chloride, potassium chloride, magnesium chloride, calcium chloride, strontium chloride, barium chloride and/or ammonium chloride;
b. aluminum chloride; and
c. silica and/or zeolite and/or apatite.

Group a. of components in the composition relates to the known alkali metal and alkaline earth metal chlorides. Of these, a combination of sodium chloride and calcium chloride is most preferred. In particular, the composition according to the invention contains a combination of sodium chloride, potassium chloride, magnesium chloride, calcium chloride and ammonium chloride.

Group b. is composed of aluminium chloride and is important for the formation of crystalline compounds, such as zeolites. Aluminium chloride is preferred, but may also be partially replaced by other chlorides of trivalent metals, such as iron (III) chloride, Group c, is composed of silica or zeolite. The zeolites used are preferably zeolites based on a combination of aluminium and silicon. If appropriate, some or all of the silica/zeolite may be replaced by cement or ground clinker, in particular Portland cement, most preferably Portland cement 52.5 R. The silica is preferably amorphous silica.

For an optimum composition of the additive, the total quantity of components from group a, is approx. 45 to 90% by weight, the total quantity of components from group b. is approx. 1 to 10% by weight, and the total quantity of components from group c. is approximately 1 to 10% by weight, based on the total weight a.+b.+c. If the silica in component c. is replaced by cement, the quantity of cement is approx. 3 to 20%.

If appropriate, the amorphous $SiO_2$ can be replaced by apatite or a combination of zeolites or a zeolite composite, in particular a zeolite composite comprising natural zeolite (45%), alkali feldspar (32%), agriniaugite (10%), wollastonite (9%), calcite (1%), gotzenite (1%), melanite, apatite, titanite (2%).

In addition to the components from groups a., b. and c. referred to above, components from group d, namely magnesium oxide and/or calcium oxide, are preferably also present in the mixture.

A preferred composition comprises at least sodium chloride, potassium chloride, magnesium chloride, calcium chloride, ammonium chloride, aluminium chloride, magnesium oxide, silica and/or zeolite and cement.

Furthermore, there may also be present a component from group e. magnesium hydrogen phosphate and/or a component from group f., consisting of magnesium sulphate and sodium carbonate.

The overall composition advantageously contains a combination of components comprising:

a sodium chloride, potassium chloride, ammonium chloride, magnesium chloride and calcium chloride
b. aluminium chloride
c. silica
d. magnesium oxide
e. magnesium monohydrogen phosphate
f. magnesium sulphate and sodium carbonate.

When these components are combined, the result is a composition which contains the following components in quantities, based on the total quantity of these components in the composition:

10 to 55% by weight of sodium chloride
5 to 40% by weight of potassium chloride
0.5 to 5% by weight of ammonium chloride
5 to 40% by weight of magnesium chloride
5 to 45% by weight of calcium chloride
1 to 15% by weight of aluminium chloride
0.5 to 10% by weight of silica
0.2 to 8% by weight of magnesium oxide
1.5 to 10% by weight of magnesium hydrogen phosphate
1.5 to 8% by weight of magnesium sulfate
1 to 10% by weight of sodium carbonate
0 to 20% by weight of cement The composition preferably comprises the following quantities of the abovementioned components:

15 to 45% by weight of sodium chloride
8 to 32% by weigh of potassium chloride
0.5 to 2% by weight of ammonium chloride 8 to 32% by weight of magnesium chloride
7.5 to 30% by weight of calcium chloride
1.5 to 6% by weight of aluminium chloride
0.5 to 2% by weight of silica
0.2 to 4% by weight of magnesium oxide
1.5 to 6% by weight of magnesium monohydrogen phosphate
1.5 to 5% by weight of magnesium sulphate
1 to 6% by weight of sodium carbonate
3 to 10% by weight of cement.

Without wishing to be tied to any specific theory, the results indicate that the components which are present form crystalline structures which are well bonded together and are homogeneously distributed, in between the cement particles, and thereby bind the cement particles. Hardened cement which is prepared without this binder or with known binders has a relatively open structure when viewed on a microscopic scale, with crystalline agglomerations which are not homogeneously distributed. Consequently, the interaction between the crystalline agglomerations and also between the cement particles and the crystalline agglomerations is poor.

The crystalline compounds which are formed by this additive are surprisingly homogeneously distributed and may be in the form of acicular structures. The homogeneous distribution results in an optimum strength and stability. The water in the cement is bound in and to the crystalline structures. Consequently, there are no local concentrations of water, and therefore the formation of potential weak spots is avoided. The crystalline structures comprise, inter alia, zeolite and/or apapite compounds. Zeolites are a widespread group of silicate crystals of, inter alia, hydrated alkali metal and alkaline earth metal aluminosilicates. Apatites belong to the group of strontium, barium or calcium halophosphates, the halogen ion usually being a chloride or fluoride, but which may also be substituted by a hydroxyl group. The formation of these structures is one of the reasons why silicon, aluminium and/or phosphate compounds are added to the composition.

This composition can be prepared by combining the above components and dry-mixing them. The composition according to the invention is preferably assembled from the abovementioned components in pure form (>97%). If appropriate, salts including bound water of crystallization, are incorporated to facilitate processing.

Suspensions based on the composition described above have a pH of between approx. 8-13.5 (1 part composition and 20 parts water, T=16.8° C.). This high pH is highly advantageous if soil which is contaminated with organic acids is to be stabilized or immobilized. These acids make it difficult to stabilize and hydrate cement even if they are present in only small quantities. The use of an additive which forms a basic mixture with water also allows such contaminated soil to be used.

The composition according to the invention can be used for:
  i. stabilizing/modifing cement;
  ii. consolidating sand, sludge and/or soil, such as for the construction and laying of bored wells, roads, dykes, tunnels, foundations and the like;
  iii. immobilizing pollutants, such as heavy metals, but also flyash;
  iv. when injecting cement compositions, such as grouting;
  v. the production of concrete.

The order of mixing is important for the use of the additive according to the invention for making cement-bound materials. This method suitably comprises the following steps:

a. preparation of the additive according to the invention;
  b. if desired, mixing of the additive with water to obtain a solution or suspension;
  c. mixing of the mixture obtained during a. or b. with cement.

Prior to or at the same time as step c), it is also possible for sand, soil or other ingredients, such as aggregate, to be admixed with the additive and water. If necessary, additional water can be added after mixing with cement. Both salt water (sea water) and fresh water can be used as the water source.

These applications are explained below.

Stabilization/consolidation of sand and/or soil takes place when, for example, laying roads, car parks, runways, dykes, tunnels, railway beds, foundations for buildings, foundations in general and retaining walls. For these applications, 0.5-2.5 kg of composition per $m^3$ of soil is used in combination with 60 to 200 kg of cement per $m^3$.

In practice, first of all the location line is traced and precompacted. Then, the location line is cut open to ⅔ of the depth which is ultimately required. The composition according to the invention is distributed in dry form or as a suspension in water. After it has been distributed, further cutting takes place down to the desired depth. Then, cement is distributed and is cut down to the desired depth. Water is added until the optimum moisture content has been reached, followed by further cutting. A suitable roller is then used for compacting, and a grader, for example, for profiling. The stabilization has to be kept moist in order to prevent it from drying out to an unacceptable extent The structure can start to be used after about three days.

In the case of on-site mixing, the trench is cut out or made available in order to be stabilized. The soil which has been taken out is stored. A metering device meters soil, cement, water and the composition according to the invention in suitable quantities. A forced mixer mixes the components into a homogeneous mixture. The mixture is transferred via a conveyor belt to a suitable means of transport, such as a lorry. This means of transport transports the ready mix to the location line which is to be stabilized or immobilized. At the location line, the mixture is distributed over a suitable thickness.

When grouting, a mixture or suspension of composition, cement and/or sand in combination with water is injected. 50-100 g of cement and approx. 2 g of composition are added per 100 g of water. In this case, a drum or mixing silo is filled with water, composition according to the invention and cement, and then the metered quantity is injected. The pressure is 10 to 400 bar.

Examples of immobilization of pollutants are the immobilization of organically or inorganically polluted soil, industrial residues, for example flyash from refuse incineration plants, residues originating from oil drilling, such as salt solutions and evaporation residues, 1.7-3 kg of composition is used per $m^3$ of material to be treated, with the addition of 100-250 kg of cement per $m^3$ of material. The same applies to soil, but with 50-250 kg of cement.

When modifying cement-bound materials, such as concrete, mortar and slurry, 180-250 kg of composition is used per $m^3$.

EXAMPLES

For the experiments given in the examples, the following composition according to the invention was used;

| Component | Quantity (% by weight of total composition) |
|---|---|
| NaCl (techn. pure) | 30 |
| NH$_4$Cl (techn. pure) | 1 |
| AlCl$_3$·6H$_2$O (extra pure) | 3 |
| KCl (techn. pure) | 16 |
| CaCl$_2$·2H$_2$O (techn. pure) | 15 |
| MgCl$_2$·6H$_2$O (techn. pure) | 16 |
| MgO (pure) | 2 |
| MgHPO$_4$·3H$_2$O (techn. pure) | 3 |
| MgSO$_4$·7H$_2$O (techn. pure) | 2.5 |
| Na$_2$CO$_3$ (techn. pure) | 3 |
| Amorphous SiO$_2$ (5-40 μm) | 1 |
| Portland cement 52.5 R (Blain 530 m$^2$/kg) | 7.5 |

This composition has a pH of approx. 9-9.5 (1 part additive and 20 pats water, T=16.8° C.) and a conductivity of 53.1 mS (T=16.8° C.).

The Portland cement has the following composition; CaO 64%, SiO$_2$ 21%, Al$_2$O$_3$ 5%, Fe$_2$O$_3$ 3%, MgO 2%, SO$_3$ 3.3%, Cl approx. 0.05%. Mineralogical composition: C3S 63%, C2S 13%, X3A 8%, C4AF 9%.

Use in Concrete

Two samples were prepared, with the following compositions:

TABLE 1

Composition of comparative sample (A) without additive and a sample (B) with the additive of the invention

| Component | A (comp.) | B |
|---|---|---|
| Aggregate 20 mm (kg) | 16.8 | 16.8 |
| Aggregate 10 mm (kg) | 8.4 | 8.4 |
| Sand (kg) | 10.0 | 10.0 |
| Ordinary Portland Cement OPC (kg) | 9.2 | 9.2 |
| Water | 4.32 | 3.17 |
| Additive of invention (g) | 0 | 15 |

First of all, water and, if present, the composition of the invention were mixed for 5 minutes. Then, the aggregates (coarse material (gravel) of 20 and 10 mm) were added, followed by mixing for 2 minutes. Finally, the cement was added, and mixing was continued for 5 minutes.

Blocks of 150 mm$^3$ in accordance with BS 1881 were produced from the mixtures. These blocks were tested after 7, 14, 28 and 56 days, cf. Table 2 for the results:

TABLE 2

Breaking stress and compressive strength as a function of time for test samples A and B

| Sample | Days | Mass g | Density | Breaking stress kN | Compressive strength N/mm$^2$ |
|---|---|---|---|---|---|
| A (comp.) | 7 | 7609 | 2250 | 766 | 34,0 |
| A (comp.) | 14 | 7994 | 2370 | 937 | 41.5 |
| A (comp.) | 28 | 7965 | 2360 | 1086 | 48.5 |
| A (comp.) | 56 | 7979 | 2360 | 1170 | 52.0 |
| B | 7 | 7659 | 2270 | 1050 | 46.5 |
| B | 14 | 8072 | 2390 | 1188 | 53.0 |
| B | 28 | 8121 | 2410 | 1412 | 63.0 |
| B | 56 | 8106 | 2400 | 1473 | 65.5 |

Thermal Stability

To test the behaviour at elevated temperature, both sample A and sample B were placed in a furnace at 105° C. for 2 hours. Then, the samples were transferred to a muffle furnace at a temperature of 250° C. After approximately 30 minutes, when the muffle furnace had reached a temperature of approximately 460° C., sample A exploded. There was no damage to sample B.

Use for the Immobilization of Bauxite

The ability of the composition according to the invention to immobilize bauxite was investigated in the following example. The base materials used were red bauxite, an orange-red, clay-like wet material, brown bauxite, a red-brown, dry, granular material Portland cement (32.5), the composition according to the invention and tap water. The amount of water was selected in such a manner that a workable mortar was obtained. The quantities of the various components are given in Table 3.

TABLE 3

Use of additive for the immobilization of bauxite

| | Grams | % | Parts |
|---|---|---|---|
| Mortar 1 | | | |
| Red bauxite (wet) | 1500 | 88.9 | 100.0 |
| Red bauxite (dry) | (1049) | | |
| Portland cement | 180 | 6.6 | 12.0 |
| Additive of invention | 7.5 | 0.3 | 0.5 |
| Water-extra | 30 | (total water 451 + 30 = 481 grams) | |

TABLE 3-continued

Use of additive for the immobilization of bauxite

|  | Grams | % | Parts |
|---|---|---|---|
| Mortar 2 |  |  |  |
| Red bauxite (wet) | 1573 | 88.9 | 143.0 |
| Red bauxite (dry) | (1100) |  | (100.0) |
| Portland cement | 132 | 10.7 | 12.0 |
| Additive of invention | 5.5 | 0.4 | 0.5 |
| Water - extra | 80 | (total water 473 + 80 = 553 grams) | |
| Mortar 3 |  |  |  |
| Brown bauxite | 1500 | 54.8 | 100.0 |
| Portland cement | 180 | 6.6 | 12.0 |
| Additive of invention | 7.5 | 0.3 | 0.5 |
| Water - extra | 250 | — | — |

A shaped body of 40×40×160 mm$^3$ was produced from all the mortars. After setting for 64 days, the linear expansion coefficients of the shaped bodies were measured.

TABLE 4

Expansion coefficients of the bauxite mortars (cf. Table 3)

| Mortar | Mean linear expansion coefficient (m/m K)* |
|---|---|
| 1. Red, wet | 12.9 |
| 2. Red, dry | 14.1 |
| 3. Brown | 16.1 |

* = mass/mass Kelvin

In addition, the effect of sodium hydroxide solution (NaOH) on the shaped bodies was measured, the shaped bodies being placed for 3×24 hours in a 30-percent NaOH solution. Neither material was visibly affected by the sodium hydroxide solution. Table 5 shows the strength of the materials after hardening for 28 days:

TABLE 5

Strength of the mortars (cf. Table 3) after hardening for 28 days

| Mortar | Density [kg/m$^3$] | Flexural and tensile strength [MPa]* | Static modulus of elasticity [MPa] | Compressive strength [MPa] | Compressive strength [MPa] |
|---|---|---|---|---|---|
| 1 | 1950 | 4.7 | 6080 | 26.9 | 26.4 |
| 2 | 1940 | 4.6 | 5090 | 26.1 | 26.3 |
| 3 | 1930 | 4.8 | 5130 | 27.1 | 27.0 |
| Mean | 1940 | 4.7 | 5430 | 26.6 | |

*1 MPa = 1 N/mm$^2$

Further tests ware carried out in order to investigate the suitability of the material as a construction material. It was found that the materials obtained comply fully with Dutch and British standards for use as a construction material.

Use for Stabilizing Soil

In the following examples, the composition according to the invention is tested as a soil stabilizer. For comparison purposes, tests were carried out with a commercial product according to the prior art based on alkali metal and alkaline earth metal constituents (additive I). The additive according to the invention is denoted as additive II.

Soil samples A and B were compiled from various existing soil samples in a mechanical laboratory. The soil classification of samples A and B was carried out in accordance with DIN 18 123-4. Sample A is a mixture of gravel and sand, with an organic material content of 1.4%. Soil type B is a mixed granular soil with a clay/sludge content (grain size 0.06 mm) of 42%. The organic material content of a dried sample of the soil was determined with the aid of the loss on ignition in accordance with DIN 18 128-GL. The mechanical properties of the soil are given in Table 6.

TABLE 6

Soil samples for stability test

| Sample | Natural water content W % | Soil classification DIN 18196 | Uniformity coefficient U = d60/d10 | Sludge/clay <0.063 mm % | Loss on ignition Comp. | Soil |
|---|---|---|---|---|---|---|
| A | 4.46 | GW | 28 | 1.52 | 14 | Gravel |
| B | 15.6 | GT | — | 42 | 5.45 | Clay-gravel mixture |

To determine the most favourable conditions for the stabilization of the soil, Proctor tests were carried out in accordance with DIN 18 127-P100X. During the laboratory tests, samples were compressed with increasing water contents, in order to ensure the maximum dry density with an optimum moisture content.

Table 7 shows the test results for the soil and the soil/cement/additive mixtures. Four different Proctor tests were carried out to determine an optimum Proctor density of the untreated soil sample A and the stabilizers. The results of these Proctor tests are given in Table 7 below.

TABLE 7

Tests results of the soil tests with and without additive for sample A (cf. Table 6)

| Sample | A | A + PC32.5 | A + comp. additive | A + additive of invention |
|---|---|---|---|---|
| Cement content % | 0 | 10 | 10 | 10 |
| Additive I (comp.) 0.1% | — | — | x | — |
| Additive II 0.1% | — | — | — | x |
| Wet density g/cm³ | 2.03 | 2.14 | 2.13 | 2.13 |
| Optimum water content for maximum dry density Wpr% | 9.40 | 8.50 | 9.00 | 9.25 |

The optimum Proctor density for sample B was determined in the same way. The results of this Proctor test are given in Table 8.

TABLE 8

Test results of the soil tests with and without additive for sample B (cf. Table 6)

| Sample | B | B + PC32.5 | B – additive comp. | B – additive of invention |
|---|---|---|---|---|
| Cement content based on mass of dry soil % | 0 | 10 | 10 | 10 |
| Additive I (comp.) 0.1% | — | — | x | — |
| Additive II 0.1% | — | — | — | x |
| Dry density g/cm³ | 1.74 | 1.76 | 1.75 | 1.75 |
| Optimum water content for maximum dry density Wpr % | 16.50 | 17.60 | 17.25 | 17.60 |

Various stabilization methods were used to produce the test samples. The soil samples A and B were stabilized using the following material:

1. PC 32.5: stabilization with cement alone
2. Stabilization with cement PC 32.5 and additive I according to the prior art.
3. Stabilization with cement PC 32.5 and additive II according to the invention.

The pH and the electrical capacitance of the aqueous solvents of the stabilization media were determined in accordance with DIN 38 404 C5 and DIN 38 404 CS. These values are given in Table 9.

The compressive strength of soil samples A and B was tested using cylindrical samples with a height of 120 mm and a diameter of 100 mm. The samples were formed with a cement content of 10% PC 32.5. The samples were produced in accordance with Proctor test DIN 18 127-P100X, with an optimum water content plus 2% and were stored in a wet room. The rate of advance during the experiment was 0.1 N/mm² per second up to the maximum breaking strength. The results of the compressive strength tests are compiled in the table below.

TABLE 9

Conductivity, pH and density of the aqueous solvents of the stabilization media

| Additive | Water ratio | Temperature in ° C. | Conductivity in mS | pH | Dry density in g/cm³ |
|---|---|---|---|---|---|
| PC32.5 | 1:20 | 16.8 | 33.4 | 6-6.5 | 1.36 |
| Prior art | 1:20 | 16.8 | 44.7 | 7-7.5 | 1.20 |
| Invention | 1:20 | 16.8 | 53.1 | 9-9.5 | 1.25 |

TABLE 10

Compressive strength as a function of time for soil samples A&B (cf. Tables 7&8)

| Sample No. | Cement % | Breaking strength KN | Compressive strength N/mm² | Days | Water content | Height mm | Mass wet g | Density dry g/cm³ |
|---|---|---|---|---|---|---|---|---|
| A + PC32.5 | | | | | | | | |
| MP1 | 8 | 44.2 | 5.63 | 14 | 9.0 | 11.40 | 2052 | 2.103 |
| MP3 | 8 | 65.2 | 8.30 | 28 | 9.0 | 11.55 | 2111 | 2.136 |
| A + Additive prior art | | | | | | | | |
| MP6 | 8 | 74.1 | 9.44 | 14 | 9.0 | 11.85 | 2133 | 2.103 |
| MP4 | 8 | 87.2 | 11.10 | 28 | 9.0 | 11.60 | 2087 | 2.102 |
| A + Additive of invention | | | | | | | | |
| MP8 | 8 | 91.2 | 11.61 | 14 | 9.0 | 11.20 | 2013 | 2,100 |
| MP10 | 8 | 115.3 | 14.69 | 28 | 9.0 | 11.20 | 2001 | 2.088 |
| B + PC32.5 | | | | | | | | |
| PC1 | 10 | 12.0 | 1.53 | 7 | 17.6 | 12.0 | 1940 | 1.751 |
| PC10 | 10 | 21.2 | 2.69 | 28 | 17.6 | 11.20 | 1817 | 1.757 |
| B + Additive prior art | | | | | | | | |
| Geo/1 | 10 | 13.7 | 1.75 | 7 | 17.6 | 10.70 | 1718 | 1.738 |
| Geo/11 | 10 | 39.7 | 5.05 | 28 | 17.6 | 11.20 | 1868 | 1.802 |
| B + Additive of invention | | | | | | | | |
| GFX-1 | 10 | 15.5 | 1.97 | 7 | 17.6 | 11.50 | 1854 | 1.746 |
| GFX-5 | 10 | 56.4 | 7.18 | 28 | 17.6 | 11.30 | 1815 | 1.740 |

In accordance with Proctor test DIN 18 127, samples were produced with an optimum water content, a height of 200 mm and a diameter of 100 mm, in order for the static and dynamic modulus of elasticity to be determined. The modulus of elasticity was determined after 7, 14 and 28 days for soil samples A and B with cement, the additive according to the prior art and the additive according to the invention, with a pre-calculated cement content of 8 to 10%. The results of tests are shown in Table 11.

A test using sea water (96.5% by weight water, 3.5% by weight of ionized salt) was also carried out. The starting material contained desert sand, and after hardening for 64 days a cement of good quality was obtained. The mean compressive strength was 6.95 N/mm², and the static modulus of elasticity was 2264.56 N/mm².

Example of a Different Composition

A composition according to the invention which also gave good results contained the following components:

TABLE 11

Modulus of elasticity as a function of time for the soil samples A & B (cf. Tables 7 & 8)

| Sample | Cement % | Days | Modulus of elasticity N/mm² | Static modulus of elasticity N/mm² |
|---|---|---|---|---|
| A + PC32.5 | 9 | 14 | 925 | 2,775 |
| A + prior art | 9 | 14 | 6,250 | 18,750 |
| A + invention | 9 | 14 | 6,250 | 18,750 |
| B + PC32.5-2 | 10 | 7 | 1,137 | 3,411 |
| B + prior art | 10 | 7 | 2,778 | 8,334 |
| B + invention | 10 | 7 | 3,125 | 9,375 |
| A + PC32.5 | 9 | 28 | 1,610 | 4,830 |
| A + prior art | 9 | 28 | 8,333 | 24,999 |
| A + invention | 9 | 28 | 8,333 | 24,999 |
| B + PC32.5-2 | 10 | 28 | 2,170 | 6,510 |
| B + prior art | 10 | 28 | 4,167 | 12,501 |
| B + invention | 10 | 28 | 6,250 | 18,750 |

| Component | Quantity (% by weight of total composition) |
| --- | --- |
| NaCl (techn. pure) | 31 |
| NH$_4$Cl (techn. pure) | 1 |
| AlCl$_3$•6H$_2$O (extra pure) | 3 |
| KCl (techn. pure) | 16 |
| CaCl$_2$•2H$_2$O (techn. pure) | 15 |
| MgCl$_2$•6H$_2$O (techn. pure) | 16 |
| MgO (pure) | 2 |
| MgSO$_4$•7H$_2$O (techn. pure) | 3 |
| Na$_2$CO$_3$ (techn. pure) | 3 |
| Zeolite A4 | 2.5 |
| Portland cement 52.5 R (Blain 530 m$^2$/kg) | 7.5 |

The use of this composition for laying a road produced a product with a high compressive strength.

The composition according to the invention has the following advantages:

Significantly better mechanical results compared to exclusively cement-bound products.

Increased impermeability to water

Higher thermal stability

For cement applications, salt water can be used as make-up water.

Long-lasting consolidation of sand and soil.

Long-term stabilization and immobilization of chemical pollutants.

It is possible to use raw materials which are present at the location of use, so that reduced quantities of raw materials have to be transported.

When used in road building, the use of the composition improves the strength of the ground to such an extent that it is possible to use thinner layers of asphalt.

Accelerated hardening, so that (construction) time is saved.

The invention claimed is:

1. Composition for reinforcing cement, which contains:
a) at least one member from the group consisting of sodium chloride, potassium chloride, magnesium chloride, calcium chloride, strontium chloride, barium chloride and ammonium chloride;
b) aluminium chloride; and
c) silica and/or zeolite and/or apatite,
comprising 45 to 90% by weight of group a), 1 to 10% by weight group b), and 1 to 10% by weight of the components from group c), based on the total weight of the composition.

2. Composition according to claim 1, which of the components from group a), contain at least sodium chloride and calcium chloride.

3. Composition according to claim 1, which contains:
a) at least one member from the group consisting of sodium chloride, potassium chloride, magnesium chloride, calcium chloride, strontium chloride, barium chloride and ammonium chloride; and
b) aluminium chloride; and
c) silica and/or zeolite.

4. Composition according to claim 1, in which at least some of the silica and/or zeolite is replaced by cement.

5. Composition according to claim 1, which also contains:
d) magnesium oxide and/or calcium oxide.

6. Composition according to claim 1, containing:
a) at least one member from the group consisting of sodium chloride, potassium chloride, magnesium chloride, calcium chloride, and ammonium chloride; and
b) aluminium chloride; and
c) silica and/or zeolite; and
d) magnesium oxide.

7. Composition according to claim 1, which, of the components from group c), contains only silica.

8. Composition according to claim 1, which also contains:
e) magnesium hydrogen phosphate; and
f) magnesium sulphate and/or sodium carbonate.

9. Composition according to claim 1, which contains:
10 to 55% by weight of sodium chloride,
5 to 40% by weight of potassium chloride,
0.5 to 5% by weight of ammonium chloride,
5 to 40% by weight of magnesium chloride,
5 to 45% by weight of calcium chloride,
1 to 15% by weight of aluminium chloride,
0.5 to 10% by weight of silica,
0.2 to 8% by weight of magnesium oxide,
1.5 to 10% by weight of magnesium hydrogen phosphate,
1.5 to 8% by weight of magnesium sulphate,
1 to 10% by weight of sodium carbonate, and
0 to 20% by weight of cement,
based on the total weight of the composition.

10. Composition according to claim 9, which contains:
15 to 45% by weight of sodium chloride 8 to 32% by weight of potassium chloride,
0.5 to 2% by weight of ammonium chloride 8 to 32% by weight of magnesium chloride,
7.5 to 30% by weight of calcium chloride,
1.5 to 6% by weight of aluminium chloride,
0.5 to 2% by weight of silica,
0.2 to 4%/o by weight of magnesium oxide,
1.5 to 6% by weight of magnesium hydrogen phosphate,
1.5 to 5% by weight of magnesium sulphate,
1 to 6% by weight of sodium carbonate, and
3 to 10% by weight of cement,
based on the total weight of these components.

11. Suspension in water of a composition according to claim 1, which, based on 1 part composition to 20 parts water, has a pH of 8-13.5.

12. Composition according to claim 1, in which at least some of the silica and/or zeolite is replaced by Portland cement.

13. Composition for reinforcing cement, which contains:
a) at least one member from the group consisting of sodium chloride, potassium chloride, magnesium chloride, calcium chloride, strontium chloride, barium chloride and ammonium chloride;
b) aluminium chloride;
c) silica and/or zeolite and/or apatite; and
d) magnesium oxide and/or calcium oxide.

* * * * *